United States Patent
Kanuma et al.

(10) Patent No.: US 9,376,534 B2
(45) Date of Patent: Jun. 28, 2016

(54) PHENYL-CONTAINING FUNCTIONAL POLYSILOXANES AND POLYCARBONATE-POLYSILOXANE COPOLYMERS MADE THEREFROM

(71) Applicant: MOMENTIVE PERFORMANCE MATERIALS JAPAN LLC, Tokyo (JP)

(72) Inventors: Koji Kanuma, Ora-gun (JP); Yataka Horie, Ora-gun (JP); Anuj Mittal, Bangalore (IN); Laxmi Samantara, Bangalore (IN); Indumathi Ramakrishnan, Bangalore (IN); Naofumi Kumabe, Kawasaki (JP); Narayana Padmanabha Iyer, Bangalore (IN); Samim Alam, Tarrytown, NY (US)

(73) Assignee: Momentive Performance Materials Japan LLC, Tokyo (JP)

(*) Notice: Subject to any disclaimer, the term of this patent is extended or adjusted under 35 U.S.C. 154(b) by 0 days.

(21) Appl. No.: 14/291,820

(22) Filed: May 30, 2014

(65) Prior Publication Data

US 2015/0141586 A1    May 21, 2015

Related U.S. Application Data

(60) Provisional application No. 61/829,416, filed on May 31, 2013.

(51) Int. Cl.
| | |
|---|---|
| *C08G 77/448* | (2006.01) |
| *C08G 64/18* | (2006.01) |
| *C08L 83/10* | (2006.01) |
| *C08G 77/04* | (2006.01) |
| *C08L 69/00* | (2006.01) |
| *C08G 77/38* | (2006.01) |
| *C08G 77/00* | (2006.01) |

(52) U.S. Cl.
CPC ........... *C08G 77/448* (2013.01); *C08G 64/186* (2013.01); *C08G 77/04* (2013.01); *C08L 69/00* (2013.01); *C08L 83/10* (2013.01); *C08G 77/38* (2013.01); *C08G 77/80* (2013.01)

(58) Field of Classification Search
CPC ..................................................... C08G 77/448
See application file for complete search history.

(56) References Cited

U.S. PATENT DOCUMENTS

| | | | | |
|---|---|---|---|---|
| 5,530,083 | A * | 6/1996 | Phelps et al. .................... | 528/25 |
| 5,661,202 | A | 8/1997 | Akamatso et al. | |
| 6,576,735 | B2 | 6/2003 | Kanagawa et al. | |
| 7,498,388 | B2 | 3/2009 | Davis et al. | |
| 7,709,581 | B2 | 5/2010 | Glasgow et al. | |
| 2002/0061997 | A1 * | 5/2002 | Kanagawa et al. ............. | 528/29 |
| 2008/0081860 | A1 | 4/2008 | Li et al. | |
| 2008/0081884 | A1 | 4/2008 | Glasgow et al. | |

FOREIGN PATENT DOCUMENTS

| | | |
|---|---|---|
| EP | 0570208 | 11/1993 |
| EP | 1654301 | 12/2011 |
| JP | 2011 173989 A | 9/2011 |

OTHER PUBLICATIONS

Donald G. LeGrand et al., "Handbook of Polycarbonate Science and Technology", Bibliographic information, (2000) Marcel Dekker, Inc.
ShinEtsu Silicones, "Reactive & Non-Reactive Modified Silicone Fluid Reactive Silicone Fluids 7-9 Storage & Handling Precautions 9", Jul. 19, 2006, www.shinetsusilicones.com.
M. Androit et al.,"Silicones in Industrial Applications", Dow Corning Europe SA, Jan. 1, 2007, www.dowcorning.com.
International Search Report and Written Opinion mailed Dec. 15, 2014.
Donald G. LeGrand et al., "Handbook of Polycarbonate Science and Technology", Chapter 5; Nonbisphenol A Polycarbonates, John Schmidhauser & Paul D. Sybert, (2000) pp. 61-106, Marcel Dekker, Inc.

* cited by examiner

*Primary Examiner* — Kuo-Liang Peng
(74) *Attorney, Agent, or Firm* — Dilworth & Barrese, LLP

(57) ABSTRACT

The invention is directed to phenyl-containing functional polysiloxanes and polycarbonate-polysiloxane copolymer compositions made therefrom having improved optical clarity and better low temperature impact resistance.

16 Claims, 6 Drawing Sheets

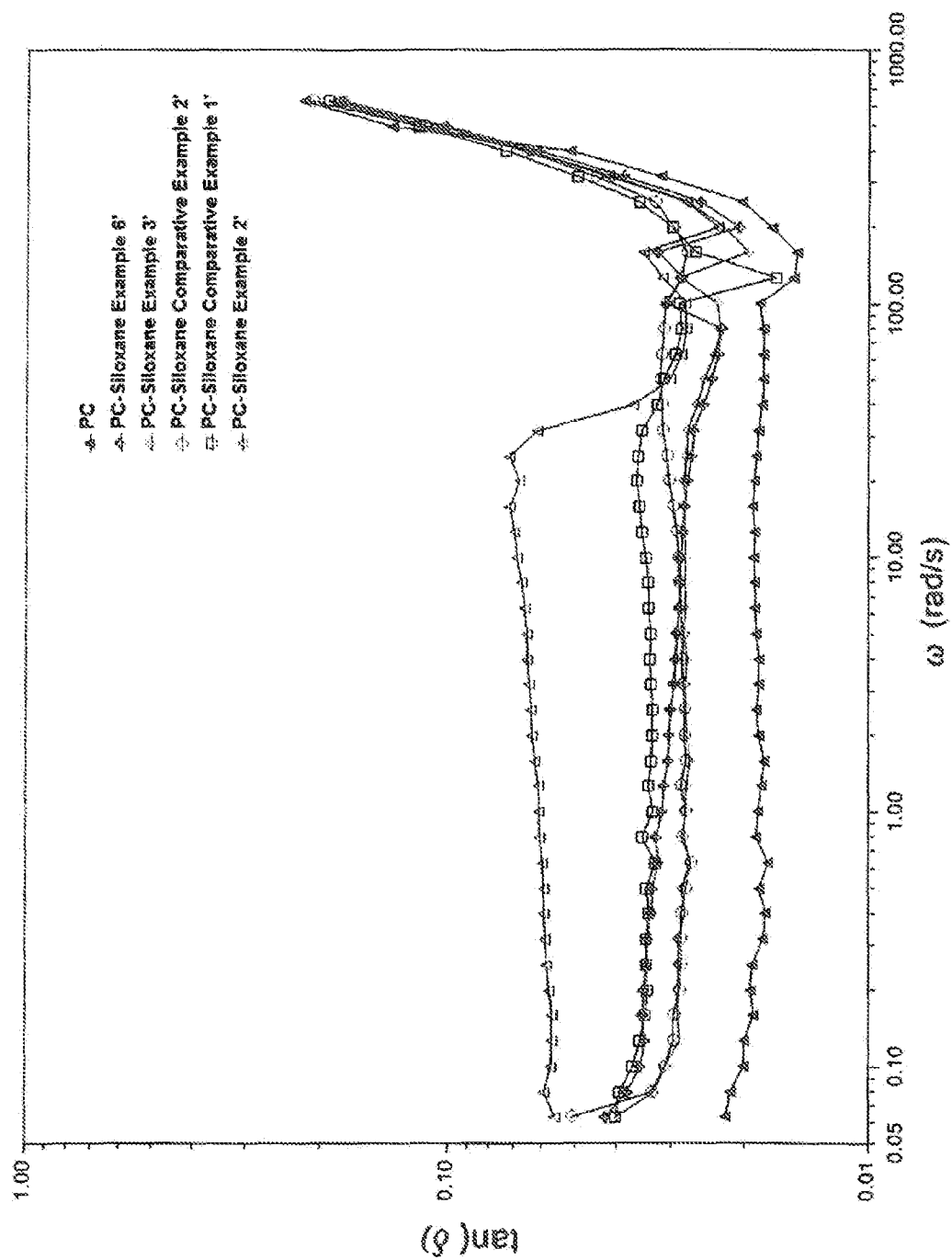

PHENYL-CONTAINING FUNCTIONAL POLYSILOXANES AND POLYCARBONATE-POLYSILOXANE COPOLYMERS MADE THEREFROM

This application claims priority to U.S. Provisional Patent Application No. 61/829,416 filed May 31, 2013.

BACKGROUND

1. Field of the Invention

The invention is directed to phenyl-containing functional polysiloxanes and polycarbonate-polysiloxane copolymers made therefrom.

2. Background of the Invention

Polycarbonate polymers are useful in the manufacture of articles and components for a wide range of applications, including automotive parts such as headlights and windshields, as well as medical devices. However, many polycarbonate polymers are brittle especially at low temperatures. Polycarbonate copolymers containing polysiloxane blocks in particular have shown excellent low temperature impact properties, improved solvent resistance, inherent flame retardancy, improved hydrolytic resistance and heat aging characteristics and excellent processability. However, due to larger difference in refractive index between polycarbonate and polysiloxane blocks, the resulting copolymer is typically opaque unless the siloxane domains are very small. Though smaller domains can be produced by using the siloxane blocks with lesser D lengths (typically <30), the low temperature impact resistance improvement is compromised in such copolymer compositions.

Eugenol-terminated polymers are known in the art for various purposes, such as heat resistance, improved ductility and thermoprocessing, solvent resistance, and the like. It is also known that eugenol may be used as an end cap for polysiloxane polymers. For example, U.S. Pat. No. 5,661,202, EP0570208A2, U.S. Pat. No. 7,709,581B2, US2008/0081860A1 disclose eugenol-terminated fluids with different substituents in the backbone or pendant thereto.

Copolymers of polycarbonate and polysiloxane are also known in the art. For example, U.S. Pat. No. 6,576,735 discloses the preparation of polycarbonate-polysiloxane copolymeric compositions from 9,9-bis(4-hydroxy-3-methylphenyl)fluorene and phenyl-containing siloxanes as monomers. Polycarbonate from 9,9-Bis(4-hydroxy-3-methylphenyl) fluorene monomer results in rigid architecture as compared to polycarbonate from Bisphenol-A. It has been submitted that siloxane-containing comonomers impart moldability. U.S. Pat. No. 7,498,388B2 discloses the use of eugenol-terminated siloxane with smaller D chains to prepare PC-polysiloxane copolymer compositions with 3-5 wt % siloxane concentration with lower BY span (the difference between the yellowness index in transmission and the yellowness index in reflectance) that gives 100% ductility only up to −30 C. The resulting polymers exhibit reduced "edge haze" during formation of molded articles.

Several attempts have been made using eugenol-terminated siloxane (D length 45-50) to make transparent (low haze) polycarbonate-polysiloxane copolymers. For example, U.S. Pat. No. 5,530,083 discloses a multistep method of making transparent polycarbonate-polysiloxane copolymers. In a first step, oligomeric bisphenol polycarbonate are prepared by phosgenating bisphenol-A using phase transfer catalyst. In a second step, bisphenol chloroformates are reacted with bis(hydroxyaryl) siloxanes in the absence of phosgene. EPI654301A1 discloses the preparation of siloxane-bischloroformate in one step and addition of siloxane-BCF to polycarbonate synthesis process in the presence of recoverable catalysts.

There is a need for polycarbonate-polysiloxane copolymer compositions with improved optical clarity (high % transmission and low haze) with better low-temperature impact resistance. The present invention is believed to provide an answer to that need.

SUMMARY OF THE INVENTION

Generally for increased utility, polysiloxane-polycarbonate copolymers were prepared and used as impact modifiers in blends with other homo- and copolycarbonates. Because these block copolymers are stable at high temperatures, they afford the best low temperature ductility along with the best thermostability of any impact modifier for polycarbonates. The addition of these block copolymers to polycarbonate blends was round to increase the low temperature ductility and decrease the loss of impact on heat aging. The functional siloxanes based polycarbonate siloxane block copolymers would have much improved property benefits when blended with polycarbonate homopolymer or copolymer.

The present invention provides a functional polycarbonate-polysiloxane copolymer that can have excellent refractive index and ductility characteristics while maintaining high transparency and low haze, and a method for preparing the copolymer. The functional polycarbonate-polysiloxane copolymer can also have a good balance of transparency, temperature resistance, chemical resistance and mechanical strength. In one aspect, the present invention is directed to a copolymer of formula (I):

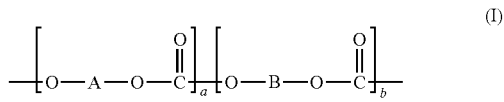

wherein:

A is a hydroxy benzene moiety derived from a compound having the structure (S):

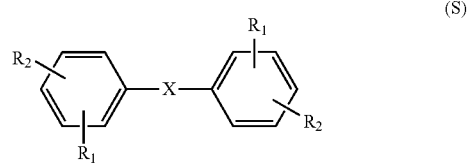

where $R_1$ is hydrogen, halogen (e.g., Cl, Br, or F), an aliphatic group having from 1 to 6 carbon atoms, an aromatic group having 6 to 8 carbon atoms, an alkoxy group having from 1 to 6 carbon atoms, or an aryloxy group having from 6 to about 10 carbon atoms; and $R_1$ is a hydroxyl group, an amine group, an acid chloride group, or a sulfonyl halide group and X is selected from the group consisting of

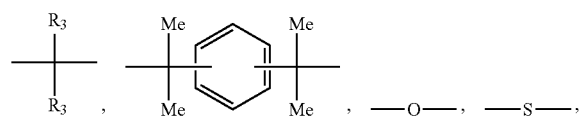

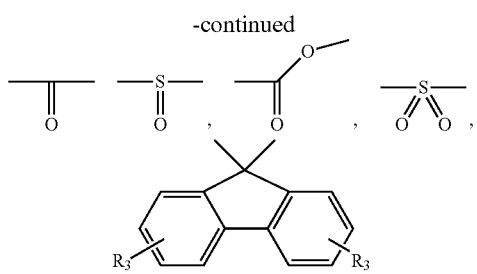

wherein $R_3$ is independently selected from the group consisting of hydrogen, halogen, an alkyl group of 1-18 carbon atoms, an aryl group of 3-14 carbon atoms, an aryloxy group of 6-10 carbon atoms, an aralkyl group of 7-20 carbon atoms, an alkoxy group of 1-10 carbon atoms, a cycloalkyl group of 6-20 carbon atoms, a cycloalkoxy group of 6-20 carbon atoms, an alkenyl group of 2-10 carbon atoms, an aralkyloxy group of from 7 to 12 carbon atoms, a nitro group, an aldehyde group, a cyano group, and a carboxyl group;

B is a bis-functionalized polydiorganosiloxane moiety derived from a compound having the structure:

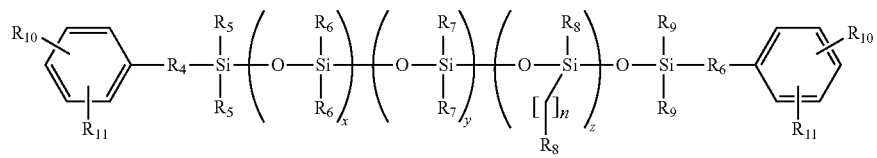

wherein $R_4$ is independently a direct link or a substituted or unsubstituted $C_1$-$C_{15}$ alkyl or $C_2$-$C_{15}$ alkylene group, optionally containing a heteronuclear atom selected from the group consisting of N, O, S, and P; $R_5$ is selected from the group consisting of alkyl, aryl, and a substituted aryl group of up to about 12 carbon atoms; $R_6$ and $R_7$ are each independently an aliphatic or aromatic hydrocarbon having from 1 to 15 carbon atoms: $R_8$ is selected from the group consisting of alkyl and aryl groups having up to 15 carbon atoms; $R_9$ is an aliphatic group having 1 to 6 carbon atoms, a monovalent or bivalent aromatic group having 6 to 15 carbon atoms, an alkoxy group having up to 15 carbon atoms, an aryloxy group of from 6 to 15 carbon atoms, or a group having the formula —Si—$(R_{12})_3$ wherein $R_{12}$ is an alkyl group having 1 to 6 carbon atoms, an unsaturated group of from 2 to about 10 carbon atoms, an aromatic group having 6 to 15 carbon atoms, or an alkoxy group having 1 to 6 carbon atoms; $R_{10}$ is hydrogen, halogen, an aliphatic group having from 1 to 6 carbon atoms, an aromatic group having from 6 to 8 carbon atoms, an alkoxy group having from 1 to 6 carbon atoms, or an aryloxy group having up to 12 carbon atoms; $R_{11}$ is a hydroxy group, an amine group, an acid anhydride group, or a sulfonyl halide group;

wherein $R_6$ and $R_7$ are not the same group, wherein at least one of $R_6$ or $R_7$ is phenyl, and wherein $R_8$ and $R_9$ are not the same group; x ranges from 1 to 130; y ranges from 1 to 15; z ranges from 0 to 15, and preferably 2-12; n ranges from 1 to 15; y+z>0 and x+y+z<=130 wherein the ratio of x to y is 0.01 to (1.1765; a ranges from 99 to 75 wt % based on the total weight of the copolymer; and b ranges from 1 to 25 wt % based on the total weight of the copolymer.

In another aspect, the present invention is directed to a polymer blend composition, comprising a polycarbonate homopolymer and the copolymer of Formula (I).

In another aspect, the present invention is directed to a copolymer of Formula (II)

(II)

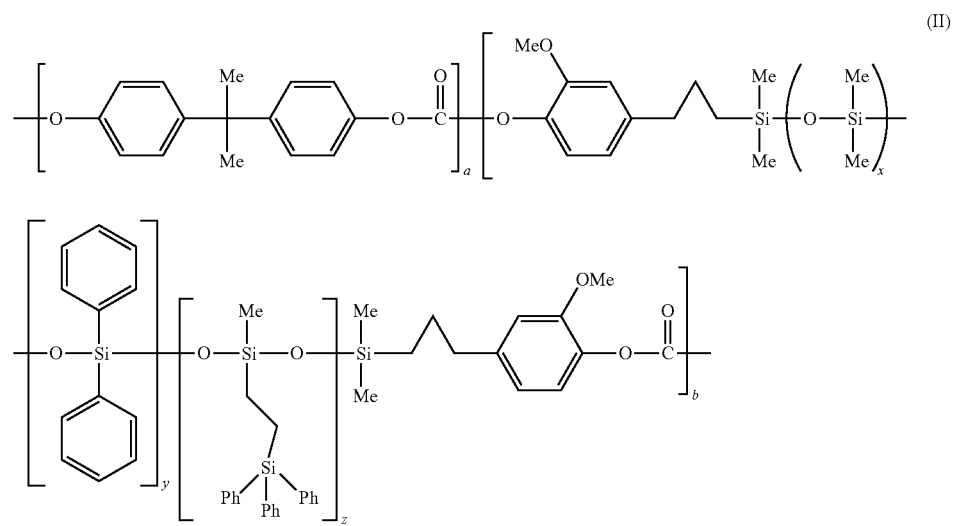

wherein
x ranges from 1 to 130;
y ranges from 1 to 12;
z ranges from 0 to 12, and preferably 2-12;
wherein y+z>0; and x+y+z<=130;
wherein the ratio of x to y is 0.01 to 0.1765;
a ranges from 80 to 99 wt % based on the total weight of the copolymer; and
b ranges from 1 to 20 wt % based on the total weight of the copolymer.

In another aspect, the present invention is directed to a polymer blend composition, comprising a polycarbonate homopolymer and the copolymer of Formula (II).

In another aspect, the present invention is directed to a method of producing a copolymer of Formula (I), comprising reacting a dihydroxy benzene compound of the formula (S) with a bis-functionalized polydiorganosiloxane compound of the structure:

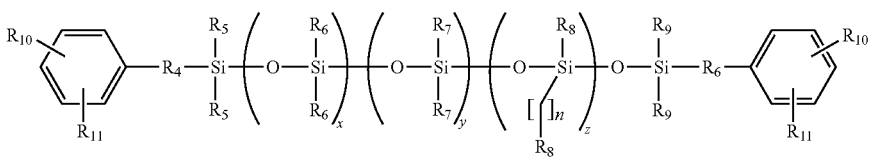

in the presence of phosgene to produce the copolymer of Formula (I),

In yet another aspect, the present invention is directed to a method of producing a polymer blend composition, comprising blending the polycarbonate copolymer of Formula (I) with a polycarbonate homopolymer.

In one preferred aspect, the present invention is directed to a copolymer of formula (I):

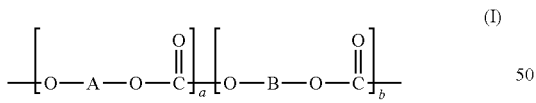 (I)

wherein:
A is a hydroxy benzene moiety derived from a compound having the structure (S):

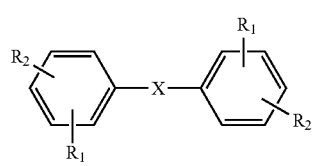 (S)

where $R_1$ is hydrogen, halogen, an aliphatic group having from 1 to 6 carbon atoms, an aromatic group having 6 to 8 carbon atoms, an alkoxy group having from 1 to 6 carbon atoms, or an aryloxy group up to 12 carbon atoms, $R_2$ is a hydroxyl group, an amine group, an acid chloride group, or a sulfonyl halide group; and X is selected from the group consisting of

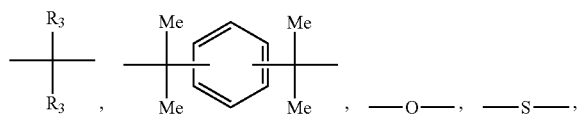

-continued

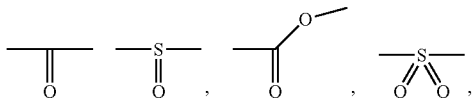

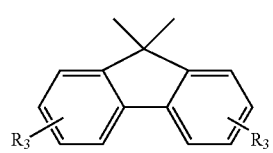

wherein $R_3$ is independently selected from the group consisting of hydrogen, halogen, an alkyl group of 1-18 carbon atoms, an aryl group of up to 14 carbon atoms, an aryloxy group of 6-10 carbon atoms, an aralkyl group of 7-20 carbon atoms, an alkoxy group of 1-10 carbon atoms, a cycloalkyl group of 6-20 carbon atoms, a cycloalkoxy group of 6-20 carbon atoms, an alkenyl group of 2-10 carbon atoms, an aralkyloxy group of up to about 15 carbon atoms, a nitro group, an aldehyde group, a cyano group, and a carboxyl group;

B is a bis-functionalized polydiorganosiloxane moiety derived from a compound having the structure:

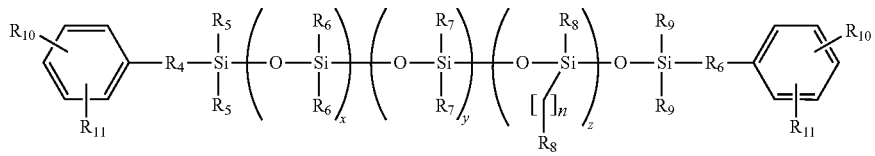

wherein $R_4$ is independently a direct link or a substituted or unsubstituted $C_1$-$C_{15}$ alkyl or $C_2$-$C_{15}$ alkylene group, optionally containing a heteronuclear atom selected from the group consisting of N, O, S, and P; $R_5$ is selected from the group consisting of alkyl, aryl, and a substituted aryl group of up to 15 carbon atoms; $R_6$ and $R_7$ are each independently an aliphatic or aromatic hydrocarbon group having from 1 to 15 carbon atoms; $R_8$ is selected from the group consisting of alkyl and aryl group having up to 15 carbon atoms; $R_9$ is an aliphatic group having 1 to 6 carbon atoms, a monovalent or bivalent aromatic group having 6 to 15 carbon atoms, an alkoxy group having 6 to 15 carbon atoms, an aryloxy group having up to 12 carbon atoms, a group having the formula —Si—$(R_{12})_3$ wherein $R_{12}$ is an alkyl group having 1 to 6 carbon atoms, an unsaturated group of from 2 to 12 carbon atoms, an aromatic; group having 6 to 15 carbon atoms, or an alkoxy group having 1 to 6 carbon atoms; $R_{10}$ is hydrogen, halogen, an aliphatic group having from 1 to 6 carbon atoms, an aromatic group having from 6 to 8 carbon atoms, an alkoxy group having from 1 to 6 carbon atoms, or an aryloxy group; $R_{11}$ is a hydroxy group, an amine group, an acid anhydride group, or a sulfonyl halide group;

wherein $R_6$ is phenyl, and wherein $R_8$ and $R_9$ are not the same group;

wherein x ranges from 1 to 130;
z ranges from 1 to 12;
n ranges from 1 to 15;
y+z>0; and x+y+z<=130;
a ranges from 99 to 75 wt % based on the total weight of the copolymer; and
b ranges from 1 to 25 wt % based on the total weight of the copolymer.

In another aspect, the present invention is directed to a bis-functionalized polydiorganosiloxane having the structure:

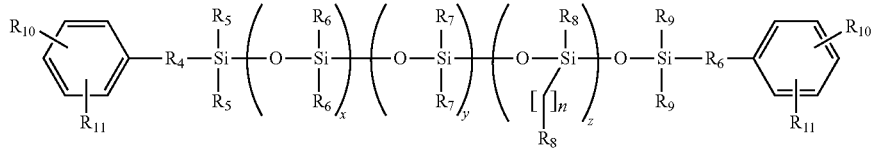

wherein $R_4$ is independently a direct link or a substituted or unsubstituted $C_1$-$C_{15}$ alkyl or $C_2$-$C_{15}$ alkylene group, optionally containing a heteronuclear atom selected from the group consisting of N, O, S, and P; $R_5$ is selected from the group consisting of alkyl, aryl, or a substituted aryl group of up to about 15 carbon atoms; $R_6$ and $R_7$ are each independently an aliphatic or aromatic hydrocarbon group having from 1 to 15 carbon atoms; $R_8$ is selected from the group consisting of alkyl and aryl group having up to 15 carbon atoms; $R_9$ is an aliphatic group having 1 to 6 carbon atoms, a monovalent or bivalent aromatic group having 6 to 15 carbon atoms, an alkoxy group having 6 to 15 carbon atoms; an aryloxy group having up to 12 carbon atoms; a group having the formula —Si—$(R_{12})_3$ wherein $R_{12}$ is an alkyl group having 1 to 6 carbon atoms, an unsaturated group of from 2 to 10 carbon atoms, an aromatic group having 6 to 15 carbon atoms or an alkoxy group having 1 to 6 carbon atoms; $R_{10}$ is hydrogen, halogen, an aliphatic group having from 1 to 6 carbon atoms, an aromatic group having from 6 to 8 carbon atoms, an alkoxy group having from 1 to 6 carbon atoms, or an aryloxy group having up to 12 carbon atoms $R_{11}$ is a hydroxy group, an amine group, an acid anhydride group, or a sulfonyl halide group;

wherein $R_6$ and $R_7$ are not the same group, wherein at least one of $R_6$ or $R_7$ is phenyl, and wherein $R_8$ and $R_9$ are not the same group; wherein x ranges from 1 to 130; y ranges from 1 to 15; z ranges from 0 to 15; n ranges from 1 to 15; y+z>0; and x+y+z<=130; and the ratio of x to y is 0.01 to 0.1765.

BRIEF DESCRIPTION OF THE DRAWINGS

The invention will be more fully understood from the following detailed description and drawings in which:

FIGS. 1(a) and 1(b) indicate the siloxane domains are 10-30 nm in polycarbonate as fainter domains. FIGS. 1(a) and (b) clearly indicate that because of good compatibility of phenyl groups with polycarbonate units (refractive index matching), the domains are observed as fainter domains and the domain size were also observed as smaller (10-30 nm) in case of phenyl containing functional polysiloxane based copolymers.

FIGS. 2(a) and 2(b) indicate the siloxane domains are 20-45 nm in polycarbonate as darker, in contrast compared to polycarbonate.

FIG. 3 and FIG. 4 are dynamic mechanical analyses representations based on the storage, loss moduli and tan(delta) responses of the polycarbonate polysiloxane copolymers of present invention in comparison with polycarbonate homopolymer. The dynamic mechanical analyses data are evident that the phenyl groups containing siloxane based polycarbonate polysiloxane copolymers are showing improved storage, loss moduli and tan(delta) responses when compared with polycarbonate homopolymer.

DETAILED DESCRIPTION OF THE INVENTION

Figure 1A:
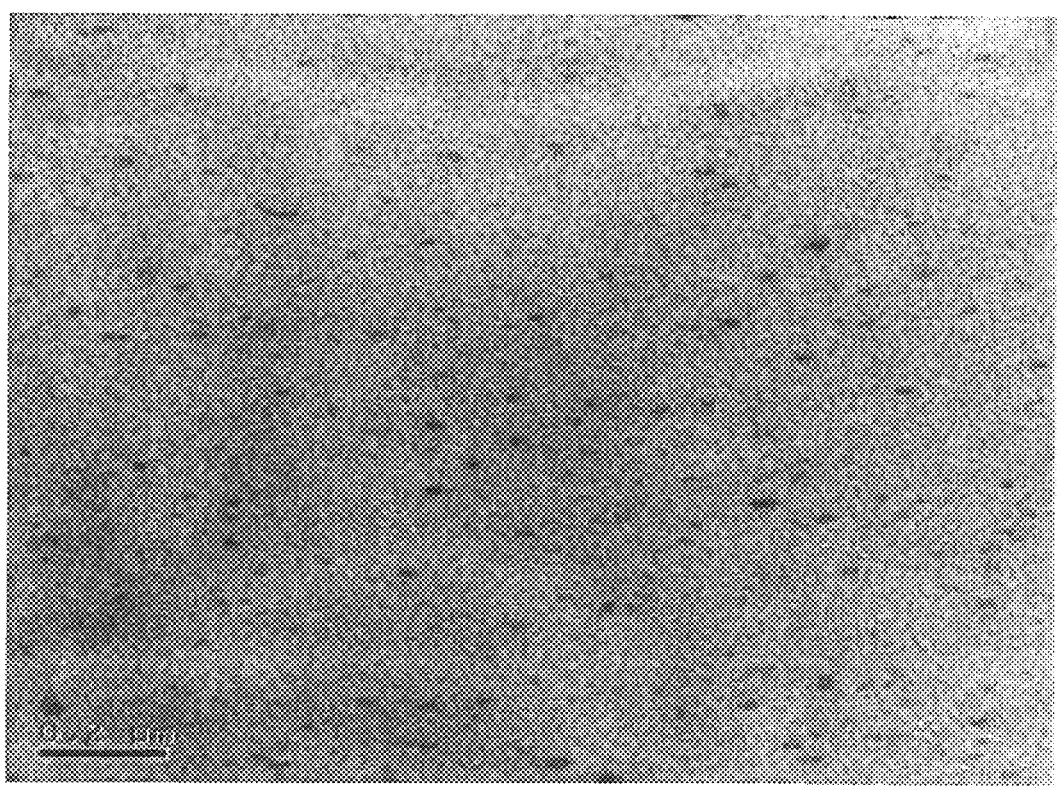
FIGS. 1(a) and 1(b) are electron micrographs showing the morphology of the phenyl-containing functional polysiloxanes and polycarbonate-polysiloxane copolymers of the invention; and Transmission Electron Microscopy (TEM) image shown in FIG. 1(a) FIG. 1 (b) are 200 nm scale bar and 100 nm scale bar magnification respectively.

The invention discloses incorporating high refractive index (RI) phenyl groups in eugenol-terminated polyorganosiloxane polymers, and the production of co-polymers and blends of co-polymers made from these eugenol-terminated polyorganosiloxane polymers. It has been unexpectedly discovered that incorporation of eugenol-terminated polyorganosiloxane polymers results in smaller domain formation in a polycarbonate matrix. This result could potentially lead to products having increased optical clarity (high transmission, low haze) and improved low temperature impact properties.

As indicated above, the present invention is directed to a copolymer of Formula (I), which is made up of two copolymer blocks each containing A and B moieties, respectively:

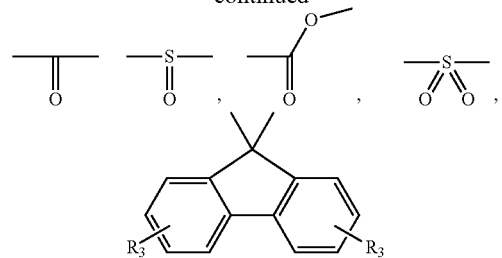

wherein $R_3$ is independently selected from the group consisting of hydrogen, halogen, an alkyl group of 1-18 carbon atoms, an aryl group of up to 14 carbon atoms, an aryloxy group of 6-10 carbon atoms, an aralkyl group of 7-20 carbon atoms, an alkoxy group of 1-10 carbon atoms, a cycloalkyl group of 6-20 carbon atoms, a cycloalkoxy group of 6-20 carbon atoms, an alkenyl group of 2-10 carbon atoms, an aralkyloxy group of up to 15 carbon atoms, a nitro group, an aldehyde group, a cyano group, and a carboxyl group. In one preferred embodiment, $R_3$ is an alkyl group having 3 carbon atoms.

In Formula (I), B is a bis-functionalized polydiorganosiloxane moiety derived from a compound having the structure:

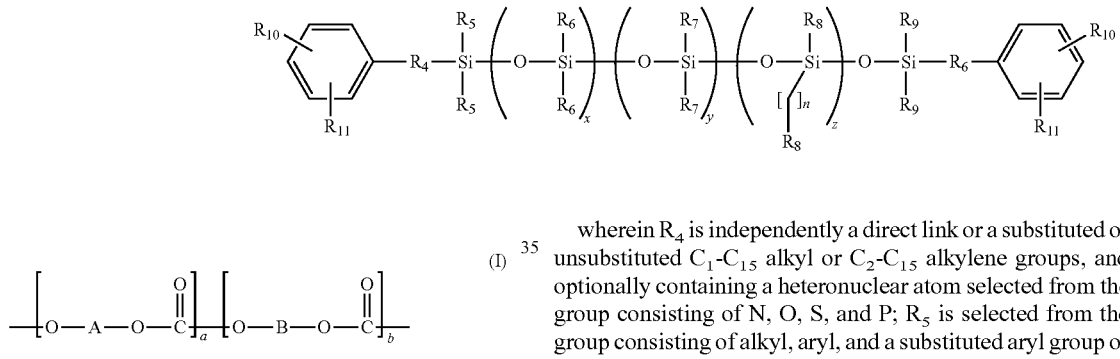

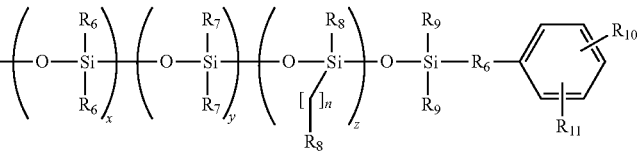
(I)

In Formula (1), A is a hydroxy benzene moiety derived from a compound having the structure (S):

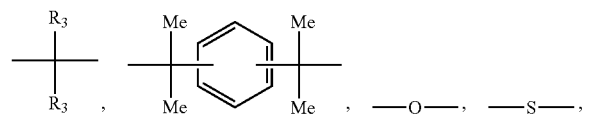
(S)

where $R_1$ is hydrogen, a halogen such as Br, Cl, or F, an aliphatic group having from 1 to 6 carbon atoms, an aromatic group having 6 to 8 carbon atoms, an alkoxy group having from 1 to 6 carbon atoms, or an aryloxy group having up to 12 carbon atoms, and $R_2$ is a hydroxyl group, an amine group, an acid chloride group, or a sulfonyl halide group. X is a bridging moiety, preferably selected from the group consisting of wherein $R_4$ is independently a direct link or a substituted or unsubstituted $C_1$-$C_{15}$ alkyl or $C_2$-$C_{15}$ alkylene groups, and optionally containing a heteronuclear atom selected from the group consisting of N, O, S, and P; $R_5$ is selected from the group consisting of alkyl, aryl, and a substituted aryl group of up to 15 carbon atoms; $R_6$ and $R_7$ are each independently an aliphatic or aromatic hydrocarbon having from 1 to 15 carbon atoms; $R_8$ is selected from the group consisting of alkyl and aryl group having up to 15 carbon atoms; $R_9$ is an aliphatic group having 1 to 6 carbon atoms, a monovalent or bivalent aromatic group having 6 to 15 carbon atoms, an alkoxy group having 6 to 15 carbon atoms; an aryloxy group of up to 12 carbon atoms; a group having the formula —Si—$(R_{12})_3$ wherein $R_{12}$ is an alkyl group having 1 to 6 carbon atoms, an unsaturated group of from 2-10 carbon atoms, an aromatic group having 6 to 15 carbon atoms, or an alkoxy group having 1 to 6 carbon atoms; $R_{10}$ is hydrogen, halogen, an aliphatic group having from 1 to 6 carbon atoms, an aromatic group having from 6 to 8 carbon atoms, an alkoxy group having from 1 to 6 carbon atoms, or an aryloxy group having up to 12 carbon atoms; $R_{11}$ is a hydroxy group, an amine group, an acid anhydride group, or a sulfonyl halide group.

$R_6$ and $R_7$ are not the same group, and $R_8$ and $R_9$ are not the same group, and at least one of $R_6$ or $R_7$ is phenyl. In a preferred embodiment, $R_6$ and $R_7$ are each independently an alkyl group, aryl group, substituted aryl group or a cycloalkyl group of up to 15 carbon atoms. In addition, x can range broadly from 1 to 100, and preferably ranges from 20 to 80. y can range broadly from 1 to 15, and preferably ranges from 1 to 12. z can range broadly from 0 to 15, and preferably ranges from 1 to 12. Among x, y, and z, y+z>0 and x+y+z<=130 and the ratio of x to y is 0.01 to 0.1765. In formula B, n can range broadly from 1 to 15, and preferably ranges from 1 to 6.

In a preferred embodiment, the copolymer of the present invention has the structure of Formula (II):

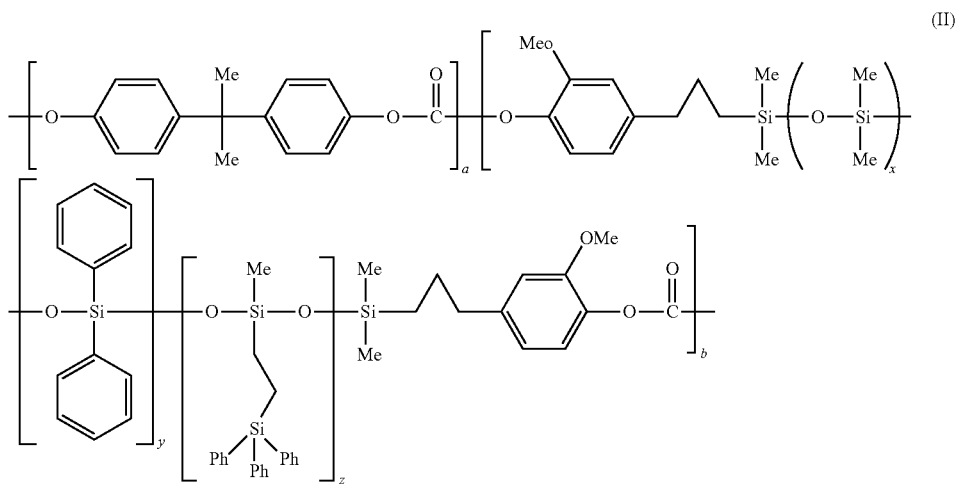

(II)

In Formula (II), x ranges from 1 to 130; y ranges from 1 to 15; z ranges from 0 to 12, and preferably 1-12; y+z>0; x+y+z<=130; the ratio of x to y is 0.01 to 0.1765; a ranges from 80 to 99 wt % based on the total weight of the copolymer; and b ranges from 1 to 20 wt % based on the total weight of the copolymer.

The invention is also directed to a polymer blend composition, comprising a polycarbonate homopolymer; and the copolymer of Formula I. Suitable polycarbonate homopolymers include homopolymers derived from dihydroxybenzene compounds of general formula A. In one embodiment, polycarbonate homopolymers derived from Bisphenol A are used. In another embodiment, invention is also directed to a polymer blend composition, comprising a polycarbonate homopolymer; and the copolymer of Formula II.

The copolymer of the present invention may be prepared by reacting a dihydroxy benzene compound of the structure (S) with a bis-functionalized polydimethylsiloxane compound of the structure:

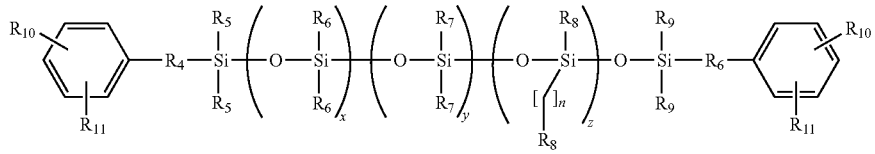

in the presence of phosgene. In one embodiment, the dihydroxy benzene compound is bisphenol A, and the bis-functionalized polydiorganosiloxane compound is bis-eugenol-endcapped[(polydimethyl)(polytdiphenyl)]siloxane.

A variety of articles of manufacture can be made using the copolymers of the invention, and particularly using polymer blend compositions containing the copolymers of the invention (for example, in combination with a polycarbonate homopolymer). For example, such articles include but are not limited to mobile phone housings, frozen food service equipment, personal safety applications including helmets, automotive and motorcycle windshields, automotive sunroofs, other automotive applications including dashboards allowing for robust airbag deployment without fragmenting, and automotive headlamp or electronics screen applications, where clarity, flame retardance, and impact resistance are beneficial.

EXAMPLES

The Examples described below illustrate the invention:

Synthesis of Eugenol End-Capped Siloxane Fluid ($^{Eu}MD_{41}M^{Eu}$)

A 1 L reaction flask was charged with $D_4$ (500 g), M'M' (40 g) and IER (15 g), stirred under $N_2$, and brought to 70° C. The reaction mixture was allowed to cool and filtered. Reaction flask was charged with M'D$_{41}$M' (500 g) and platinum catalyst (0.2 total wt %), stirred under $N_2$, and brought to 80° C. Eugenol (30 g) was charged to an addition funnel and added dropwise at a rate to maintain a reaction temperature of 100° C. Following the addition, the reaction was brought to 120° C. and maintained for 2 h. Completion of the hydrosilylation reaction was confirmed by NMR. The reaction mixture was allowed to cool, treated with Celite and filtered. Similar procedure was followed for making $^{Eu}MD_{74}M^{Eu}$. The same synthetic protocol was used for making comparative Example 2.

Examples 1-6, 7, 8 and Comparative Examples 1-2

Synthesis of Phenyl Containing Siloxane Fluid

A 1 L 3-necked round flask equipped with a mechanical stirrer, a thermometer and a vacuum distillation was charged 352 g of silanol terminated methyl phenyl siloxane fluid (YF3804). 149 g of hydrogen terminated methyl siloxane fluid)(M'D$_{18}$M') and 8.15 g of octamethylcyclotetrasiloxane. The mixture was heated to 90° C. and then added linear phosphonitrilic, chloride (LPNC) catalyst for condensation and rearrangement reactions. The mixture was vacuumed to 90 mmHg and held at 90° C. for 20 hours. The reaction mixture was then added 15.3 g of sodium hydrogen carbonate to neutralize the LPNC catalyst. The mixture was cooled to under 40° C. and filtered with Radiolite #800. The refractive index of each sample was measured. The results are shown in Table 3. Examples 1-6 are hydrogen terminated siloxane (precursor) having diphenylsiloxy groups of 2-12 units respectively. Example 7 is pendant hydrogen containing eugenol terminated siloxane and example 8 is pendant hydrogen containing eugenol terminated siloxane having diphenylsiloxy groups of 4 units. Comparative Examples 1-2 do not have di phenylsiloxy groups to differentiate the properties derived from the phenyl group.

TABLE 1

Retractive Index Values of Phenyl-Containing Siloxane Fluids

| Samples | Structure | Refractive Index |
|---|---|---|
| Comparative Example 1 | $^{H}M\text{-}D_{45}\text{-}M^{H}$ | 1.4020 |
| Comparative Example 2 | $^{H}M\text{-}D_{74}\text{-}M^{H}$ | 1.4020 |
| Example 1 | $^{H}M\text{-}D_{21}D^{Ph2}{}_{2}M^{H}$ | 1.4395 |
| Example 2 | $^{H}M\text{-}D_{42}D^{Ph2}{}_{4}M^{H}$ | 1.4413 |
| Example 3 | $^{H}M\text{-}D_{65}D^{Ph2}{}_{6}M^{H}$ | 1.4408 |
| Example 4 | $^{H}M\text{-}D_{21}D^{Ph2}{}_{4}M^{H}$ | 1.4622 |
| Example 5 | $^{H}M\text{-}D_{42}D^{Ph2}{}_{8}M^{H}$ | 1.4663 |
| Example 6 | $^{H}M\text{-}D_{65}D^{Ph2}{}_{12}M^{H}$ | 1.4654 |
| Example 7 | $^{Eu}MD_{45}D^{H}{}_{4}M^{Eu}$ | 1.4186 |
| Example 8 | $^{Eu}MD_{45}D^{Ph2}{}_{4}D^{H}{}_{1}M^{Eu}$ | 1.4510 |

Synthesis of Eu-DMeDPh-Eu Siloxane Fluids 200 g of the fluid produced in Example 4 was hydrosilyiated with 12.8 g of Eugenol using 5% Pt/Aluminum catalyst (0.085 g) for 120° C. for 5 h and filtered with Radiolite #800, followed by thin film distillation at 220° C., 5 mmHg. The refractive index of the resulting material was measured to be 1.4493.

Example 9

Synthesis of $^{Eu}M(D)_{65}(DPh_{2})_{6}(Dvinyl)_{8}M^{Eu}$ Siloxane Fluids

A 250 ml RB flask was charged with 100 g of Eugenol terminated phenyl fluid, 2,4,6,8-tetramethyl-2,4,6,8-tetravinylcyclotetrasiloxane ($D_{4}^{vinyl}$) (10.7 g) and concentrated $H_{2}SO_{4}$ catalyst (0.2-0.5 g). The reaction mixture was brought to 80° C. and stirred under $N_{2}$ for 16-24 h. After completion of the reaction, the reaction mixture was neutralized and filtered through Celite. The resulting fluid was then stripped at 190° C./5 mbar.

Example 10

Synthesis of Triphenlyisilane Pendant Siloxane Eugenol Terminated Siloxane Fluid 100 g of the fluid produced in Example 7 and 8 above was hydrosilylated with triphenylsilane (4.1 g) using Pt/Aluminum catalyst (0.02-0.05 wt for 120° C. for 5 h and filtered with Celite, followed by thin film distillation at 220° C., 5 mmHg.

Synthesis of Polycarbonate 200 g of Bisphenol-A (BPA) and 2.0 g of Triethylbenylammonium chloride (BTAC) are taken in 4 necked RB flask containing 150 ml of water and 150 ml of dichloromethane (DCM). 120 g of triphosgene was weighed in a glass vial under nitrogen atmosphere and was dissolved in 100 mL of DCM and transferred to the addition funnel, 125 ml of 40 wt % NaOH solution was prepared in water and transferred to another additional funnel fixed in the reactor. Both triphosgene and NaOH are added to the reaction mixture simultaneously with vigorous stirring. NaOH addition was carefully done in such a way that pH of the reaction mixture was maintained between 5 and 6. Thereafter required amount of NaOH was added to increase pH to 10-11. The reaction mixture was stirred for another 5-10 min, 4 g of 4-cumyl phenol (pCP) and 0.8 g of triethyl amine (TEA) were added. Stirring was continued for another 5-10 min and the pH was increased to 12 by adding aqueous NaOH. The reaction W as stopped and organic layer was separated from aqueous layer using separating funnel. The polymer (organic layer) was washed with 1N HCl and precipitated in 3-4 liters of methanol. The final product was dried Overnight in an vacuum over ($10^{-3}$ mm of Hg) maintained at 60-70° C.

Example 11

Synthesis of PC-PDMS Copolymer 9.132 g of bisphenol-A (BPA), 2.283 g of siloxane fluid and 0.113 g of phase transfer catalyst (BTAC: benezene triethylammonium chloride) were added to the four necked RB flask containing 50 mL each of water and dichloromethane (DCM). 7.56 g of triphosgene was weighed in a glass vial under nitrogen atmosphere; dissolved in 25 ml. DCM and transferred to the addition funnel connected to the RB flask. 25 mL of 25-30 wt % NaOH solution was transferred to second additional funnel fixed in the reactor. Both triphosgene and NaOH are added to the reaction mixture simultaneously with vigorous stirring (300-400 rpm). NaOH addition was carefully done in such a way that pH of the reaction mixture was maintained between 5 and 6; stirring was further continued for another 40-60 min. Thereafter required amount of NaOH was added to increase pH to 10-11. The reaction mixture was stirred for another 5-10 min, 0.2123 g of 4-cumyl phenol (pCP) and 50.6 mg of triethyl amine (TEA) were added. Stirring was continued for another 5-10 min and the pH was increased to 12 by adding aqueous NaOH. The reaction was stopped and organic layer was separated from aqueous layer using separating funnel. The polymer (organic layer) was washed with 1N HCl and precipitated in 3-4 liters of methanol. The final product was dried overnight in an vacuum oven ($10^{-3}$ mm of Hg) maintained at 60-70° C.

Homo/Copolymerization Synthesis

Table 2 outlines reagents and materials used in the processes of producing homo- and copolymer syntheses.

TABLE 2

Reagents and Materials

| | Copolymer Synthesis | Homopolymerization |
|---|---|---|
| Reagents | Weight (g) | Weight (g) |
| BPA | 25-18 | 50-80 |
| Dichloromethane (DCM) | 100-500 | 50-500 |
| Water | 100-500 | 50-500 |
| Carbonate source | 5-20 | 10-18 |
| Sodium Hydroxide | 50 | 25 |

TABLE 2-continued

Reagents and Materials

| Reagents | Copolymer Synthesis Weight (g) | Homopolymerization Weight (g) |
|---|---|---|
| Siloxane Fluid | 0-5 | NA |
| Triethylamine (TEA) | 0.1-0.4 | 0.06-0.10 |
| Methanol | 5000-6000 | 3000-4000 |
| Polymer Yield | 90% | 90% |

Synthesis of Polycarbonate-Polysiloxane Copolymers 10.278 g of Bisphenol-A, 1.142 g of phenyl containing eugenol terminated siloxane fluid of examples 1-8 and 0.113 g of BTAC were added to the four necked round bottom (RB) flask containing 50 mL each of water and DCM. 7.42 g of triphosgene was weighed in a glass vial under nitrogen atmosphere and was dissolved in 25 mL DCM and transferred to the addition funnel carefully. 25 mL of 25-30 wt % NaOH solution was transferred to second additional funnel fixed in the reactor. Both triphosgene and NaOH are added to the reaction mixture simultaneously with vigorous stirring (300-400 rpm). NaOH addition was carefully done in such a way that pH of the reaction mixture was maintained between 5 and 6. The stirring was continued for another 20 min. The remaining amount of NaOH was added to increase pH to 10-11. The reaction mixture was stirred for another 5-10 min, 0.16 g of pCP and 54.4 mg of TEA were added. Stirring was continued for another 5-10 min and the pH was increased to 12 by adding aqueous NaOH. The reaction was stopped and organic layer was separated from aqueous layer using separating funnel. The polymer (organic layer) was washed with 1N HCl and precipitated in large excess of methanol. The final product was dried in an oven at 60-70° C. for overnight. Similar procedure was repeated using eugenol terminated siloxane fluid with D length 45 in Comparative Example 3 and using eugenol terminated siloxane fluid with D length 74. Results are shown in Tables 3 and 4,

TABLE 3

Analysis of Polycarbonate-Polysiloxane Copolymers

| | Samples | | | | | | | | |
|---|---|---|---|---|---|---|---|---|---|
| | PC-siloxane-2' | PC-siloxane-3' | PC-siloxane-4' | PC-siloxane-5' | PC-siloxane-6' | PC-siloxane-7' | PC-siloxane-8' | Comparative Example 3' | Comparative Example 4' |
| Reactive siloxane containing phenyl units (%) | 10 | 5 | 10 | 5 | 10 | 10 | 10 | 10 | 10 |
| (Wt, g) | 1.142 g | 0.5710 g | 1.142 g | 0.5710 g | 1.142 g | 1.142 g | 1.142 g | 1.142 g | 1.142 g |
| % BPA(wt, g) | 90 10278 | 95 10.849 | 90 10.278 | 95 10.849 | 90 10.278 | 90 10.278 | 90 10.278 | 90 10.278 | 90 10.278 |
| End-capper (pCP, %) | 1.5 | 2.5 | 2.5 | 2 | 2 | 2 | 2 | 2 | 2 |

TABLE 4

Compositional Details of Polycarbonate-Polysiloxane Copolymers:

| Samples | $M_{n, SEC}$ | $M_{w, SEC}$ | PDI |
|---|---|---|---|
| PC-siloxane-2' | 52,700 | 116,900 | 2.13 |
| PC-siloxane-3' | 15,300 | 28,200 | 1.84 |
| PC-siloxane-4' | 12,800 | 23,400 | 1.83 |
| PC-siloxane-5' | 33,600 | 58,000 | 1.71 |
| PC-siloxane-6' | 41,800 | 79,100 | 1.89 |
| PC-siloxane-7' | 30,971 | 79,460 | 2.56 |
| PC-siloxane-8' | 6,573 | 16,467 | 2.25 |
| PC-siloxane Comparative Example-1' | 52,400 | 95,800 | 1.82 |
| PC-siloxane Comparative Example-2' | 37,100 | 68,000 | 1.83 |

Preparation of PC and PC-Siloxane Blends

Up to 5 wt % of the polycarbonate-polysiloxane polymers made are melt-blended in Haake batch mixer with approximately 95 wt % of polycarbonate at 305 deg C. for 7 min. Compositional details are shown in Table 5. The molten strands were collected and used for morphological characterization.

TABLE 5

Compositional Details of Polycarbonate-Polysiloxane Copolymer Blends:

| Blends | PC-Siloxane Copolymer in Blend | % Siloxane in the Blend |
|---|---|---|
| Blend-1 | PC-siloxane-1 | 0.415 |
| Comparative Blend-1 | PC-siloxane-CE-1 | 0.450 |
| Comparative Blend-1 | PC-siloxane-CE-1 | 0.415 |

Figure 1B:
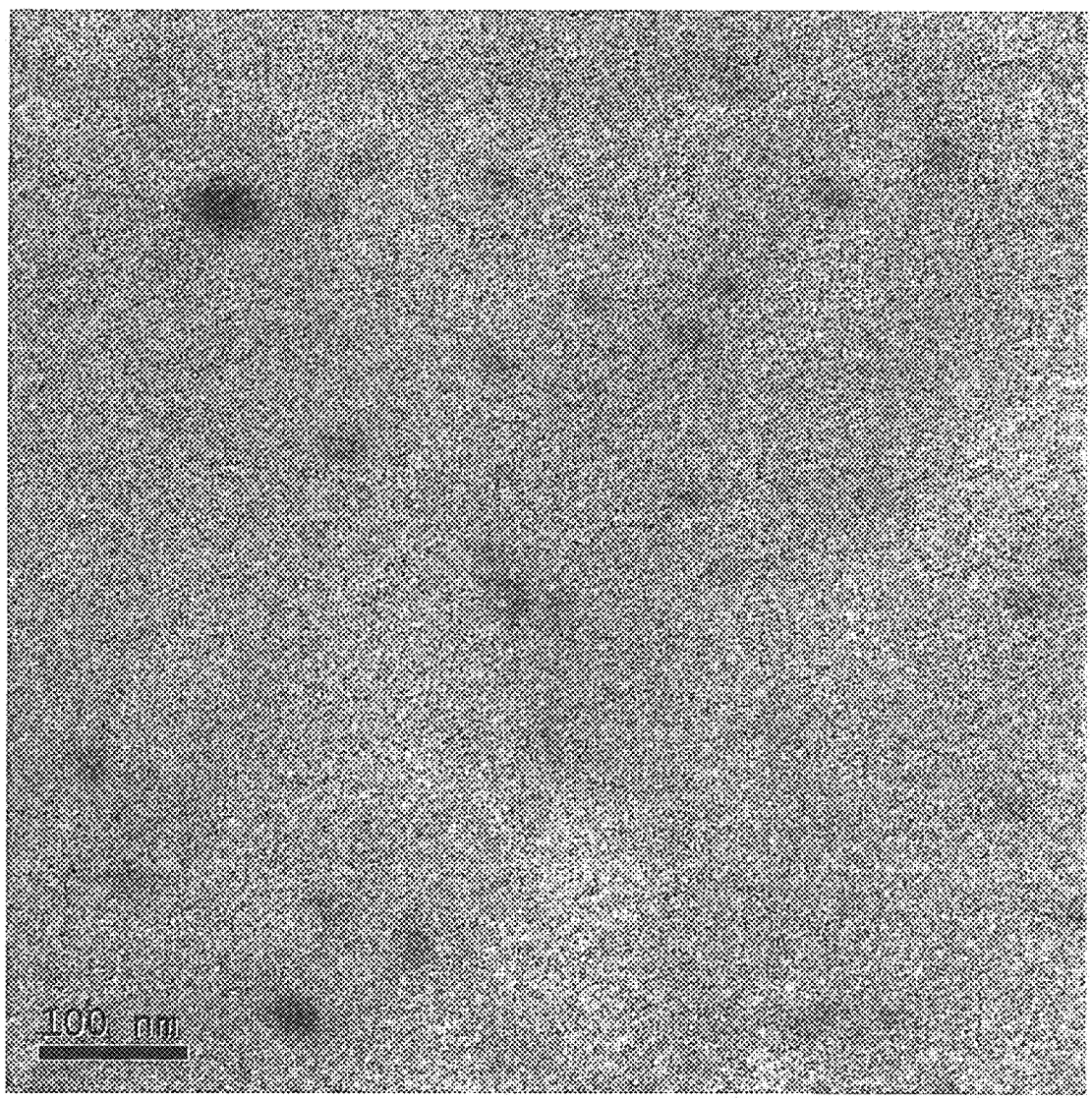
Figure 2A:
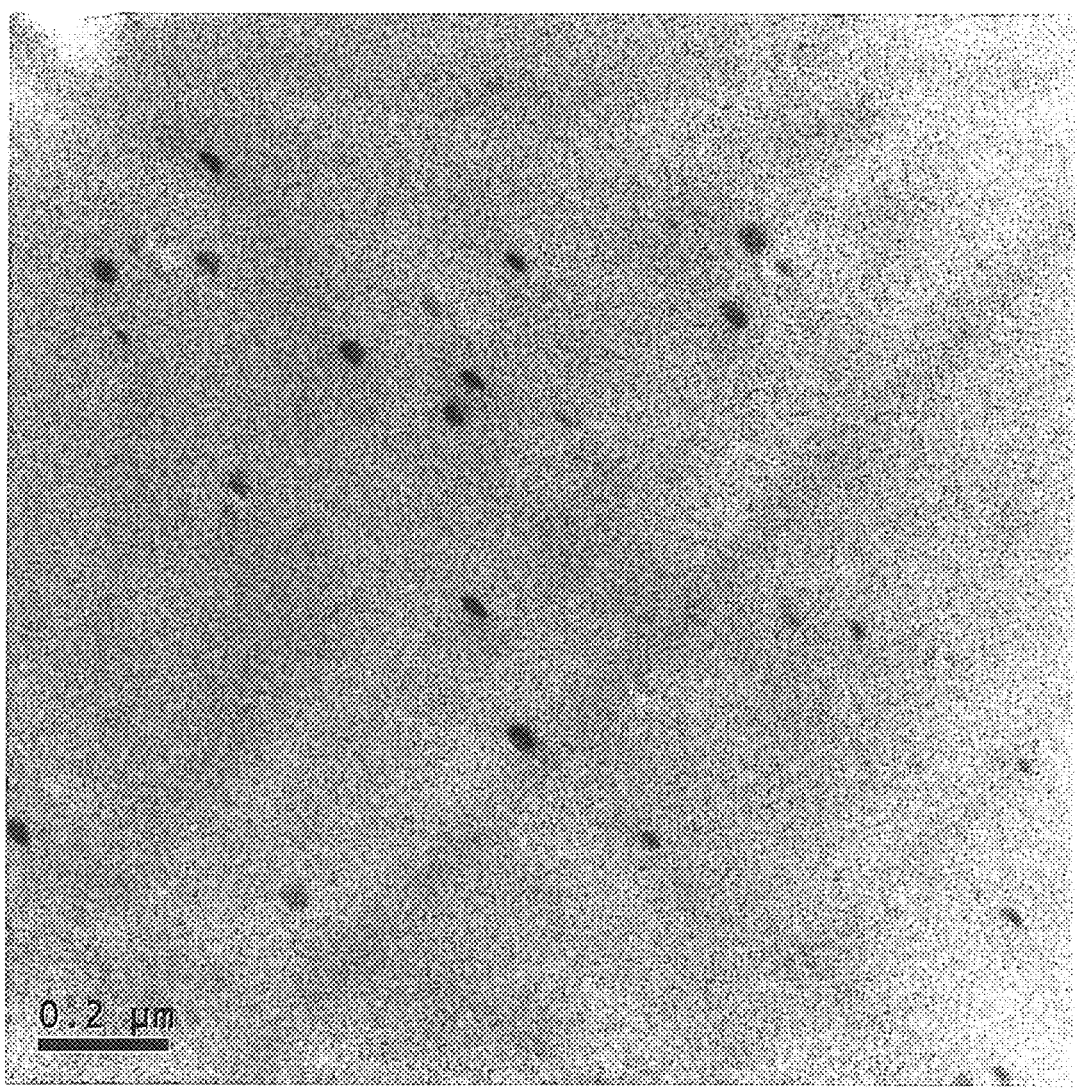
FIGS. 2(a) and 2(b) are electron micrographs showing the morphology of polysiloxanes and polycarbonate-polysiloxane copolymers of Comparative Blend 1 in Example 9. Transmission Electron Microscopy (TEM) image shown in FIGS. 2 (a) and (b) are 201) nm scale bar and 100 nm scale bar magnification respectively.
Figure 2B:
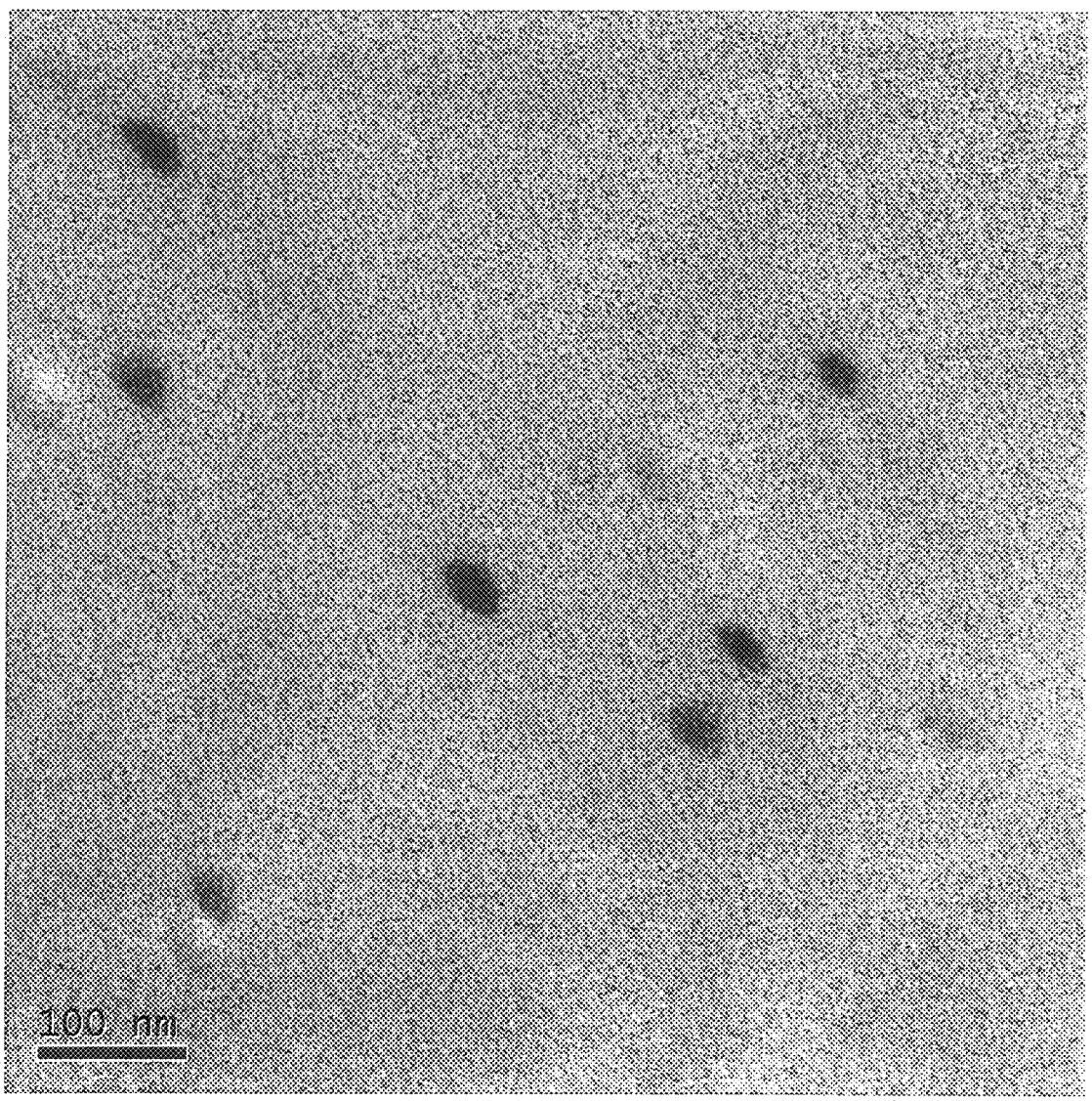

The morphology of the above samples were analyzed by transmission electron microscopy (TEM) and the results are shown in FIGS. 1 and 2. FIG. 1 shows Blend 1 of Table 5 at 0.2 μm (left) and 100 nm (right) resolutions. As shown in FIG. 1, the size of siloxane domains in Blend 1 are in 10-30 nm range. FIG. 2 shows Comparative Blend 1 also at 0.2 μm (left) and 100 nm (right) resolutions and depicts domain size in the range of 20-45 nm. The smaller domains can potentially lead to better optical clarity in the final product. Thus, as illustrated in FIGS. 1 and 2 and the above Examples, polycarbonate-polysiloxane copolymers and blends synthesized using the above functional fluid formed smaller domains in PC matrix which can lead to increased optical clarity. Other potential benefits of these compositions are improved low temperature impact resistance, improved thermal stability and electrical insulating properties.

Dynamic Mechanical Analysis

Figure 3:
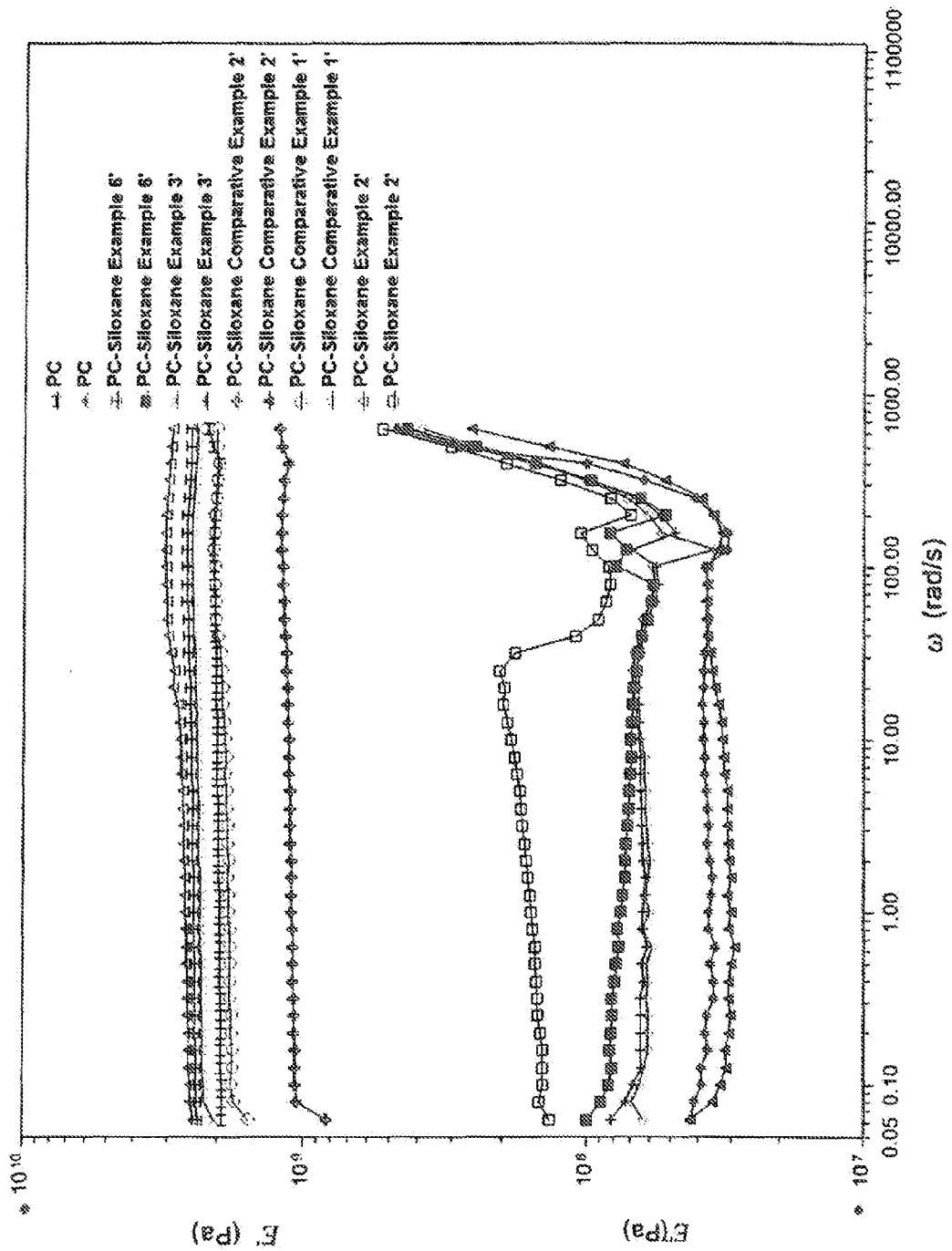

Dynamic mechanical analysis was carried out on a RSA-G2 Dynamic Mechanical Analyzer (TA Instrument Inc). A specimen 30 mm long, 13 mm wide and 3 mm thick was mounted in two grips 25 mm apart. The specimen was then subjected to a periodic linear displacement (oscillatory stress) perpendicular to the sample thickness at a frequency of 1 Hertz. The material response was measured by a transducer to calculate the storage and loss moduli (FIG. 3). The whole experiment was carried out within Linear Viscoelastic Regime. The tests were performed at temperature of −30° C. The sample temperature during the measurement was controlled by "FCO" under nitrogen atmosphere.

Property Evaluations

In one embodiment, the PC-siloxane copolymers of the present invention were blended with polycarbonate homopolymer and the micro injection molded blends were found to show improved mechanical strength properties, improved transparency and haze percentages, improved barrier properties and excellent comparative tracking index values when compared with polycarbonate homopolymer.

What is claimed is:

1. A copolymer of formula (I):

$$\left[O-A-O-\underset{\|}{\overset{O}{C}}\right]_a\left[O-B-O-\underset{\|}{\overset{O}{C}}\right]_b \quad (I)$$

wherein:
   A is an aromatic moiety derived from a compound having the structure (S), wherein S is a bisphenol A;
   B is a bis-functionalized polydiorganosiloxane moiety derived from a compound having the structure

[structure showing $R_{10}$, $R_{11}$, $R_4$, $R_5$, $R_6$, $R_7$, $R_8$, $R_9$ groups with Si-O-Si linkages and subscripts $x$, $y$, $z$, $n$]

wherein $R_4$ is independently a direct link or a substituted or unsubstituted C1-C15 alkyl or C2-C15 alkylene group, optionally containing a heteronuclear atom selected from the group consisting of N, O, S, and P;

$R_5$ is selected from the group consisting of alkyl, aryl, or a substituted aryl group of up to 15 carbon atoms; $R_6$ and $R_7$ are each independently an aliphatic or aromatic hydrocarbon group having from 1 to 15 carbon atoms or a cycloalkyl group having 1 to 15 carbon atoms; $R_8$ is selected from the group consisting of alkyl and aryl group having 1 to 15 carbon atoms; $R_9$ is an aliphatic group having 1 to 6 carbon atoms, a monovalent aromatic group having 6 to 15 carbon atoms, an alkoxy group having 6 to 15 carbon atoms; an aryloxy group of up to 12 carbon atoms; a group having the formula —Si—$(R_{12})_3$ wherein $R_{12}$ is an alkyl group having 1 to 6 carbon atoms, an unsaturated group of from 2 to 12 carbon atoms, an aromatic group having 6 to 15 carbon atoms or an alkoxy group having 1 to 6 carbon atoms; $R_{10}$ is hydrogen, halogen, an aliphatic group having from 1 to 6 carbon atoms, an aromatic group having from 6 to 8 carbon atoms, an alkoxy group having from 1 to 6 carbon atoms, or an aryloxy group having up to 12 carbon atoms; $R_{11}$ is a hydroxy group;

wherein $R_6$ and $R_7$ are not the same group, wherein at least one of $R_6$ or $R_7$ is phenyl, and wherein $R_8$ and $R_9$ are not the same group;

wherein x ranges from 1 to 130;
y ranges from 1 to 15;
z ranges from 0 to 15;
n ranges from 1 to 15;
x+y ranges from 1 to 130;
y+z>0; and x+y+z<=130;
the ratio of y to x is 0.008 to 0.130;
a ranges from 99 to 75 wt % based on the total weight of the copolymer; and
b ranges from 1 to 25 wt % based on the total weight of the copolymer.

2. The copolymer of claim 1 wherein said halogen is selected from Cl, Br, or F.

3. The copolymer of claim 1, wherein x ranges from 40 to 80.

4. The copolymer of claim 1, wherein y ranges from 1 to 12.

5. The copolymer of claim 1, wherein z ranges from 0 to 12.

6. The copolymer of claim 1, wherein n ranges from 1 to 6.

7. A polymer blend composition, comprising
a polycarbonate homopolymer; and
the copolymer of claim 1.

8. A method of producing the polymer blend composition of claim 7, comprising blending the polycarbonate copolymer of Formula (I) with a polycarbonate homopolymer.

9. An article of manufacture comprising the polymer blend composition of claim 7.

10. The article of claim 9, selected from the group consisting of mobile phone housings, frozen food service equipment, helmets, automotive and motorcycle windshields, and automotive sunroofs, dashboards, headlamps, or electric screens.

11. A copolymer of Formula (II):

[Structure II showing bisphenol A carbonate unit linked to methoxyphenyl-dimethylsiloxane unit with subscripts $a$ and $x$]

-continued

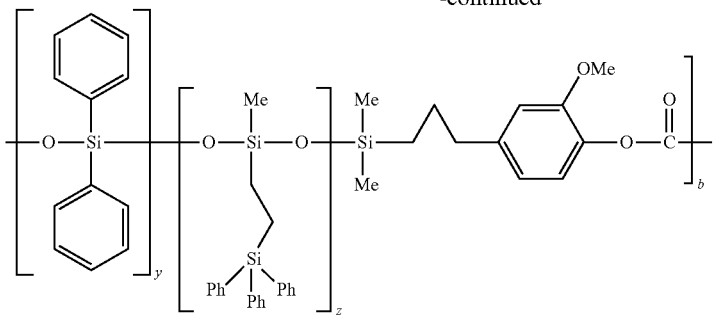

wherein
x ranges from 1 to 130;
y ranges from 1 to 12;
z ranges from 0 to 12;
x+y+z<=130;
the ratio of y to x is 0.008 to 0.130;
a ranges from 80 to 99 wt % based on the total weight of the copolymer; and
b ranges from 1 to 20 wt % based on the total weight of the copolymer.

12. A polymer blend composition, comprising:
a polycarbonate homopolymer; and
the copolymer of claim 11.

13. An article of manufacture comprising the polymer blend composition of claim 12.

14. The article of claim 13, selected from the group consisting of mobile phone housings, frozen food service equipment, helmets, automotive and motorcycle windshields, and automotive sunroofs, dashboards, headlamps, or electric screens.

15. A method of producing a copolymer of Formula (I),

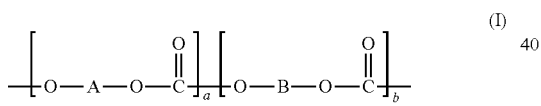

wherein:
A is an aromatic moiety derived from a compound having the structure (S), wherein S is a bisphenol A;
B is a bis-functionalized polydiorganosiloxane moiety derived from a compound having the structure

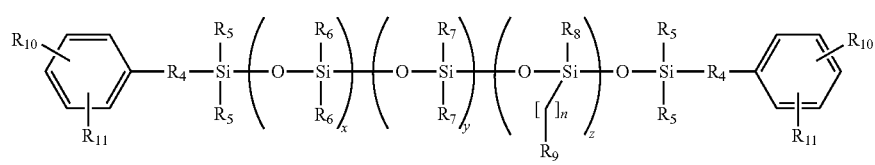

wherein $R_4$ is independently a direct link or a substituted or unsubstituted C1-C15 alkyl or C2-C15 alkylene group, optionally containing a heteronuclear atom selected from the group consisting of N, O, S, and P;
$R_5$ is selected from the group consisting of alkyl, aryl, or a substituted aryl group of up to 15 carbon atoms;
$R_6$ and $R_7$ are each independently an aliphatic or aromatic hydrocarbon group having from 1 to 15 carbon atoms or a cycloalkyl group having 1 to 15 carbon atoms; $R_8$ is selected from the group consisting of alkyl and aryl group having up to 15 carbon atoms; $R_9$ is an aliphatic group having 1 to 6 carbon atoms, a monovalent aromatic group having 6 to 15 carbon atoms, an alkoxy group having 6 to 15 carbon atoms; an aryloxy group; a group having the formula —Si—$(R_{12})_3$ wherein $R_{12}$ is an alkyl group having 1 to 6 carbon atoms, an unsaturated group of from 2 to 10 carbon atoms, an aromatic group having 6 to 15 carbon atoms or an alkoxy group having 1 to 6 carbon atoms; $R_{10}$ is hydrogen, halogen, an aliphatic group having from 1 to 6 carbon atoms, an aromatic group having from 6 to 8 carbon atoms, an alkoxy group having from 1 to 6 carbon atoms, or an aryloxy group of up to 12 carbon atoms; $R_{11}$ is a hydroxy group;

wherein $R_6$ and $R_7$ are not the same group, wherein at least one of $R_6$ or $R_7$ is phenyl, and wherein $R_8$ and $R_9$ are not the same group;

wherein x ranges from 1 to 130;
y ranges from 1 to 15;
z ranges from 0 to 15;
n ranges from 1 to 15;
x+y ranges from 1 to 130;
y+z>0; and x+y+z<=130;
the ratio of y to x is 0.008 to 0.130;
a ranges from 99 to 75 wt % based on the total weight of the copolymer; and
b ranges from 1 to 25 wt % based on the total weight of the copolymer
wherein the method comprises reacting a dihydroxy aromatic compound having the general structural formula (S) with a bis-functionalized polydiorganosiloxane compound having the formula:

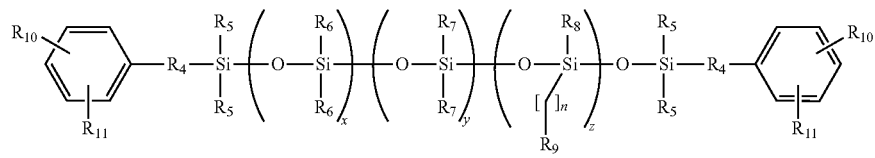
in the presence of carbonating agent to produce the copolymer of Formula (I).
16. The method of claim 15, wherein said bis-functionalized polydiorganosiloxane compound is a hydroxyl-terminated bis-functionalized polydiorganosiloxane.
* * * * *